(12) United States Patent  
Tailor et al.

(10) Patent No.: US 8,355,722 B1
(45) Date of Patent: Jan. 15, 2013

(54) SERVICE INITIATION BASED ON ALTERNATIVE RESOURCES AND QOS

(75) Inventors: PinalKumari K. Tailor, Ashburn, VA (US); Esmail Hejazi Dinan, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 732 days.

(21) Appl. No.: 12/188,248

(22) Filed: Aug. 8, 2008

(51) Int. Cl.
*H04W 4/00* (2009.01)
(52) U.S. Cl. .................................. 455/436; 370/331
(58) Field of Classification Search .......... 455/436–439; 370/331
See application file for complete search history.

(56) References Cited

U.S. PATENT DOCUMENTS

| 7,269,423 | B2 | 9/2007 | Lee et al. | |
| 7,610,393 | B1 * | 10/2009 | Chen et al. | 709/230 |
| 7,630,378 | B2 * | 12/2009 | Kleo | 370/395.21 |
| 2005/0250497 | A1 * | 11/2005 | Ghosh et al. | 455/436 |
| 2007/0076612 | A1 | 4/2007 | Iyer et al. | |
| 2007/0298803 | A1 * | 12/2007 | Kawabata et al. | 455/436 |

* cited by examiner

*Primary Examiner* — George Eng
*Assistant Examiner* — Nizar Sivji
(74) *Attorney, Agent, or Firm* — O'Brien Jones, PLLC

(57) ABSTRACT

First and second indicators that indicate the availability of an air link resource are received from a first base station and second base station, respectively, that are in communication with a wireless device. A third indicator and a fourth indicator that indicate the availability of an access network resource are received from the first base station and the second base station, respectively. A core network resource indicator is received. The first base station is selected based on the first indicator, the second indicator, the third indicator, and the fourth indicator. A path resource indicator is determined based on the first indicator, the third indicator, and the core network resource indicator. The path resource indicator is communicated to the wireless device. A response to the path resource indicator is received from the wireless device.

15 Claims, 5 Drawing Sheets

SERVICE INITIATION BASED ON ALTERNATIVE RESOURCES AND QOS

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known a long term evolution (LTE). Additional standards such as the fourth generation communication system (4G) are also being pursued.

All of these standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network including processes for registering on the network, carrier modulation, frequency bands of operation, and message formats.

OVERVIEW

A method of operating a communication system is disclosed. A first indicator that indicates the availability of an air link resource is received from a first base station that is in communication with a wireless device. A second indicator that indicates the availability of the air link resource is received from a second base station that is in communication with the wireless device. A third indicator that indicates the availability of an access network resource is received from the first base station. A fourth indicator that indicates the availability of the access network resource is received from the second base station. A core network resource indicator is received. The first base station is selected based on the first indicator, the second indicator, the third indicator, and the fourth indicator. A path resource indicator is determined based on the first indicator, the third indicator, and the core network resource indicator. The path resource indicator is communicated to the wireless device. A response to the path resource indicator is received from the wireless device.

A method of initiating a communication service is disclosed. A first set of resource metrics associated with a wireless device and a first communication path between the wireless device and an access network element is received. The first communication path includes a first wireless communication link between the wireless device and a first base station. A second set of resource metrics associated with the wireless device and a second communication path between the wireless device and the access network element is received. The second communication path includes a second wireless communication link between the wireless device and a second base station. The first communication path is selected based on the first set of resource metrics and the second set of resource metrics. A resource availability indicator and a quality of service indicator are determined based on the first set of resource metrics. The resource availability indicator and the quality of service indicator are communicated to the wireless device. An acceptance indicator is received from the wireless device.

A method of operating a wireless device is disclosed. A resource availability indicator that is based on a first set of resource metrics associated with the wireless device and a first communication path between the wireless device and an access network element is received. The first communication path includes a first wireless communication link between the wireless device and a first base station. A quality of service indicator that is based on the first set of resource metrics associated with the wireless device and the first communication path is received. A service acceptance indicator is sent based on the resource availability indicator and the quality of service indicator.

DETAILED DESCRIPTION

Figure 1:
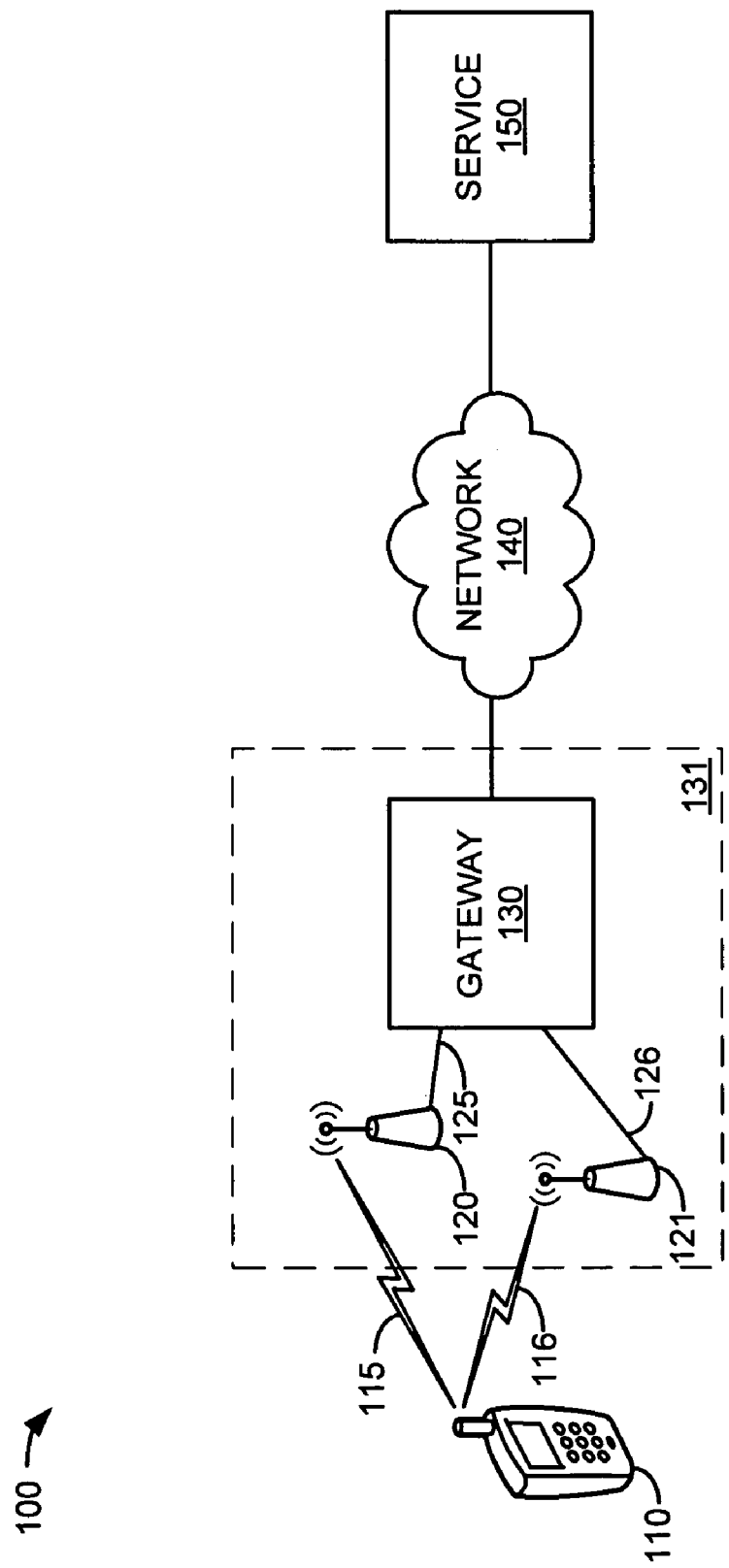
FIG. 1 is a block diagram illustrating a communication system.

FIG. 1 is a block diagram illustrating a communication system. In FIG. 1, communication system 100 comprises: wireless device 110, wireless link 115, wireless link 116, access network 131, network 140, and service 150. Access network 131 includes base station 120, base station 121, backhaul link 125, backhaul link 126, and gateway 130. Wireless device 110 is operatively coupled to base station 120 and base station 121 via wireless link 115 and wireless link 116, respectively. Base station 120 is operatively coupled to gateway 130 via backhaul link 125. Base station 121 is operatively coupled to gateway 130 via backhaul link 126. Gateway 130 is operatively coupled to network 140. Network 140 is operatively coupled to service 150.

Thus, wireless device 110 may be operatively coupled to service 150 via two communication paths. The first communication path includes wireless link 115, base station 120, backhaul link 125, gateway 130, and network 140. The second communication path includes wireless link 116, base station 121, backhaul link 126, gateway 130, and network 140. Thus, it should be understood that wireless device 110 is positioned in a location where the service area for base station 120 and the service area for base station 121 overlap.

Access network 131 may comprise a computer, a network, or a collection of computers and networks that couple, link, or otherwise operatively provide wireless device 110 with communication service. It should be understood that access network 131 may include additional elements not shown. Access network 131 may comprise secondary data networks. For example, access network 131 may include a local network, a long distance network, a packet network, or any combination thereof, as well as other types of networks. Access network 131 may be or include one or more of an access service network (ASN), an access service network gateway (ASN-GW), wireless local access network access gateway (WAG), packet data gateway (PDG), mobile switching center (MSC) and packet data serving node (PDSN). Gateway 130 may be an ASN-GW. In an embodiment, access network 131 may comprise a WiMAX specified system whose elements communicate using WiMAX specified protocols.

Access network 131 includes base stations 120 and 121. Base station 120 or base station 121 may be any wireless system that provides an air interface to wireless device 110 and communication connectivity with gateway 130 via backhaul links 125 and 126, respectively. Examples of base station 120 or base station 121 include, base transceiver stations (BTSs), radio base stations (RBSs), Node B, enhanced Node B (eNBs) and others. Base station 120 or base station 121 may include a number of elements known to those skilled in the art comprising a transceiver, power amplifier, combiner, duplexer, antenna and control function.

Wireless device 110 may be any device, system, combination of devices, or other such communication platform capable of communicating wirelessly with base station 120 and base station 121. Wireless device 110 may be, for example, an a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with access network 131 via base station 120 or base station 121. Other types of communication platforms are possible.

Wireless device 110 may establish a communication session with access network 131 in order to receive communication service from service 150 via network 140. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

In an embodiment, to receive a communication service via network 140, wireless device 110 may require certain resources or a certain quality of service (QoS). For example, to receive a video stream from service 150, wireless device 110 may require a minimum throughput (i.e., bytes per second). In addition, to ensure user satisfaction, wireless device 110 may require a certain quality of service (e.g., unsolicited grant service or a particular DiffServ per-hop behavior) to ensure smooth display of the video stream.

To ensure that wireless device 110 receives the resources and/or quality of service required for a session that wireless device 110 is initiating, one or more elements of communication system 100 may determine the resources available and the quality of service provided by the elements along a plurality of communication paths that can link wireless device 110 and service 150. One or more elements of communication system 100 may then determine which of those communication paths should be used to link wireless device 110 and service 150 based on the resources available, and quality of service provided, by the plurality of communication paths.

After determining which communication path should be used, the available resources and quality of service along that communication path are determined. This is communicated to wireless device 110. Based on the requirements that wireless device 110 has for the link to service 150, wireless device 110 may accept or reject the offered available resources and/or quality of service. Wireless device 110 may accept by initiating (or continuing to initiate) the service. Wireless device 110 may reject by terminating the service, or by stopping a process of initiating the service.

In an embodiment, gateway 130 may act to determine the communication path to be used to link wireless device 110 to service 150. Wireless device 110 may transmit an indicator to each base station 120-121 with which it can establish (or has established) wireless links 115-116. This indicator will typically include an indication of RF conditions such as a modulation and coding scheme (MCS), signal to interference and noise ratio (SINR), or a received signal strength indication (RSSI) associated with a base station 120-121.

Each base station 120-121 may determine the availability of an air link resource. This air link resource is a resource that would be consumed by the link between wireless device 110 and service 150. The availability of the air link resource may be based on one or more of: downlink or uplink slot utilization, downlink or uplink traffic throughput, available downlink or uplink air interface resources, and QoS.

Each base station 120-121 may determine the amount of base station 120-121 and wireless link 115-116 resources required to link wireless device 110 and service 150. The amount of these resources required to link wireless device 110 and service 150 may be based on one or more of: an indicator of RF conditions associated with wireless device 110; an RSSI associated with wireless device 110; a CINR associated with wireless device 110; a throughput requirement associated with wireless device 110; and, a QoS requirement associated with wireless device 110.

Each base station 120-121 may determine the availability of an access network resource. For example, each base station 120-121 may determine an indicator of backhaul link 125-126 availability. The availability of the access network resource may be based on one or more of: a maximum uplink or downlink capacity for backhaul link 125 or 126; a maximum QoS that is supported by backhaul link 125 or 126; the amount of traffic in the downlink or uplink direction along backhaul link 125 or 126; the downlink or uplink utilization of backhaul link 125 or 126; a throughput requirement associated with wireless device 110; and, a QoS requirement associated with wireless device 110.

In an embodiment, the information received or determined about wireless device 110, available air interface resources, available base station resources, and available access network resources may be communicated to gateway 130. Gateway 130 may determine the resources that gateway 130 has available to link wireless device 110 and service 150. Gateway 130 may determine the resources that network 140 has available to link wireless device 110 to service 150.

Based on the information received or determined about wireless device 110, available air interface resources, available base station 120-121 resources, available gateway 130 resources, and available network 140 resources, gateway 130 may select a communication path to link wireless device 110 to service 150. For example, gateway 130 may determine that the best communication path to link wireless device 110 to service 150 is the first communication path, described above, which included wireless link 115, base station 120, backhaul link 125, gateway 130, and network 140.

Gateway 130 may determine an end-to-end resource availability that corresponds to the available resources (such as throughput or QoS) that are available to link wireless device 110 and service 150 along the selected communication path. Gateway 130 may determine the resource availability for the selected communication path based on the information received or determined about wireless device 110, available air interface resources, available base station 120-121 resources, available gateway 130 resources, and available network 140 resources.

Gateway 130 may then perform a policy check to determine if offering wireless device 110 the available resources that are available to link wireless device 110 and service 150 along the selected communication path is allowed. If it is, then the available resources that are available to link wireless device 110 to service 150 are communicated to wireless device 110. Examples of available resources would be one of, or a combination of, a maximum throughput, a minimum throughput, a QoS level, a WiMAX flow classification, or a DiffServ per-hop behavior.

Based on the available resources that are communicated to wireless device 110, wireless device 110 may accept or reject the available resources. For example, if the available resources are insufficient to support streaming video, wireless device 110 may not initiate a link with service 150 to receive streaming video. In another example, if the available resources are insufficient to support an adequate user experience for a VoIP call, wireless device 110 may terminate the call. In another example, if the available resources are sufficient to support web browsing, wireless device 110 may initiate a web session with service 150.

Thus, before a communication link is established between wireless device 110 and service 150, wireless device 110 is made aware of the resources (e.g., throughput and QoS) that will be available. Also, if the communication link between wireless device 110 and service 150 is established, the level of service to be provided to that communication link is based on the conditions of the elements along that communication link. In addition, more than one path is considered before selecting a communication path to provide to link wireless device 110 and service 150.

Figure 2:
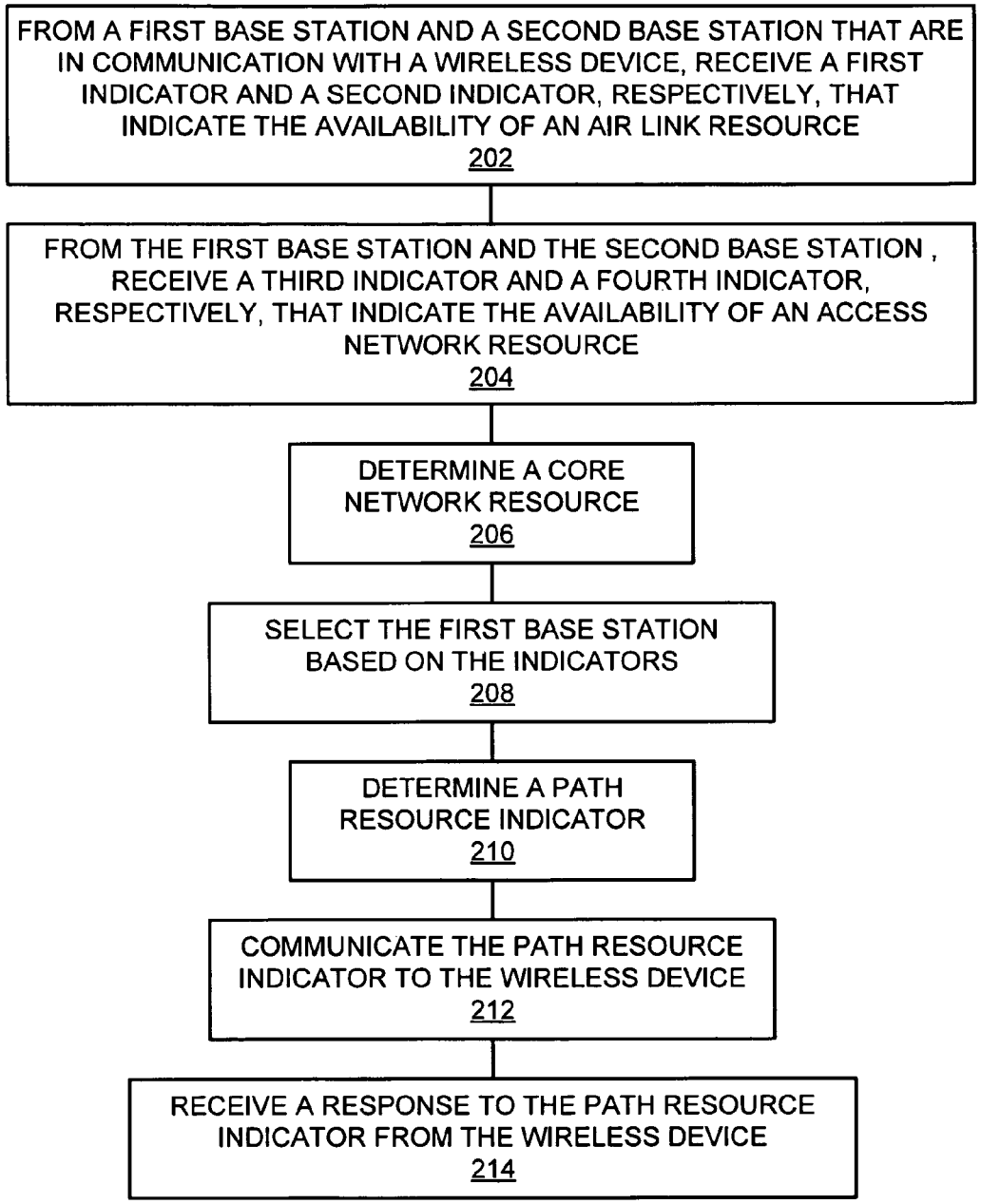
FIG. 2 is a flowchart illustrating a method of operating a communication system.

FIG. 2 is a flowchart illustrating a method of operating a communication system. The steps illustrated in FIG. 2 may be performed by one or more elements of communication system 100.

From a first base station and a second base station that are in communication with a wireless device, a first indicator and a second indicator, respectively, are received that indicate the availability of an air link resource (202). For example, gateway 130 may receive from base stations 120 and 121 the downlink and uplink slot utilization, the downlink and uplink throughput, and other indicators of available wireless link 115-116 resources.

From the first base station and the second base station, a third indicator and a fourth indictor, respectively, are received that indicate the availability of an access network resource (204). For example, gateway 130 may receive from base station 120 and base station 121 indicators of the maximum available capacity of backhaul link 125 and backhaul link 126, respectively. In another example, gateway 130 may receive from base station 120 and base station 121 indicators of the QoS that can be provided by backhaul link 125 and backhaul link 126, respectively A core network resource is determined (206). For example, gateway 130 may determine the maximum throughput network 140 can provide to link gateway 130 and service 150. In another example, gateway 130 may determine the QoS that is provided by network 140 to link gateway 130 and service 150.

The first base station is selected based on the indicators (208). For example, base station 120 may be selected to be part of a communication link between wireless device 110 and service 150 based on the first, second, third, and fourth indicators described previously.

A path resource indicator is determined (210). For example, gateway 130 may determine an indicator of maximum throughput associated with a communication path linking wireless device 110 and service 150 that includes wireless link 115, base station 120, backhaul link 125, gateway 130, and network 140. In another example, gateway 130 may determine QoS associated with a communication path linking wireless device 110 and service 150 that includes wireless link 115, base station 120, backhaul link 125, gateway 130, and network 140.

The path resource indicator is communicated to the wireless device (212). For example, a maximum throughput and/or a QoS associated with a proposed path linking wireless device 110 and service 150 may be communicated to wireless device 110.

A response to the path resource indicator is received from the wireless device (214). For example, wireless device 110 may respond to path resource indicator by indicating an acceptance of the service level corresponding to path resource indicator. In another example, wireless device 110 may respond to path resource indicator by rejecting the service level corresponding to path resource indicator.

Figure 3:
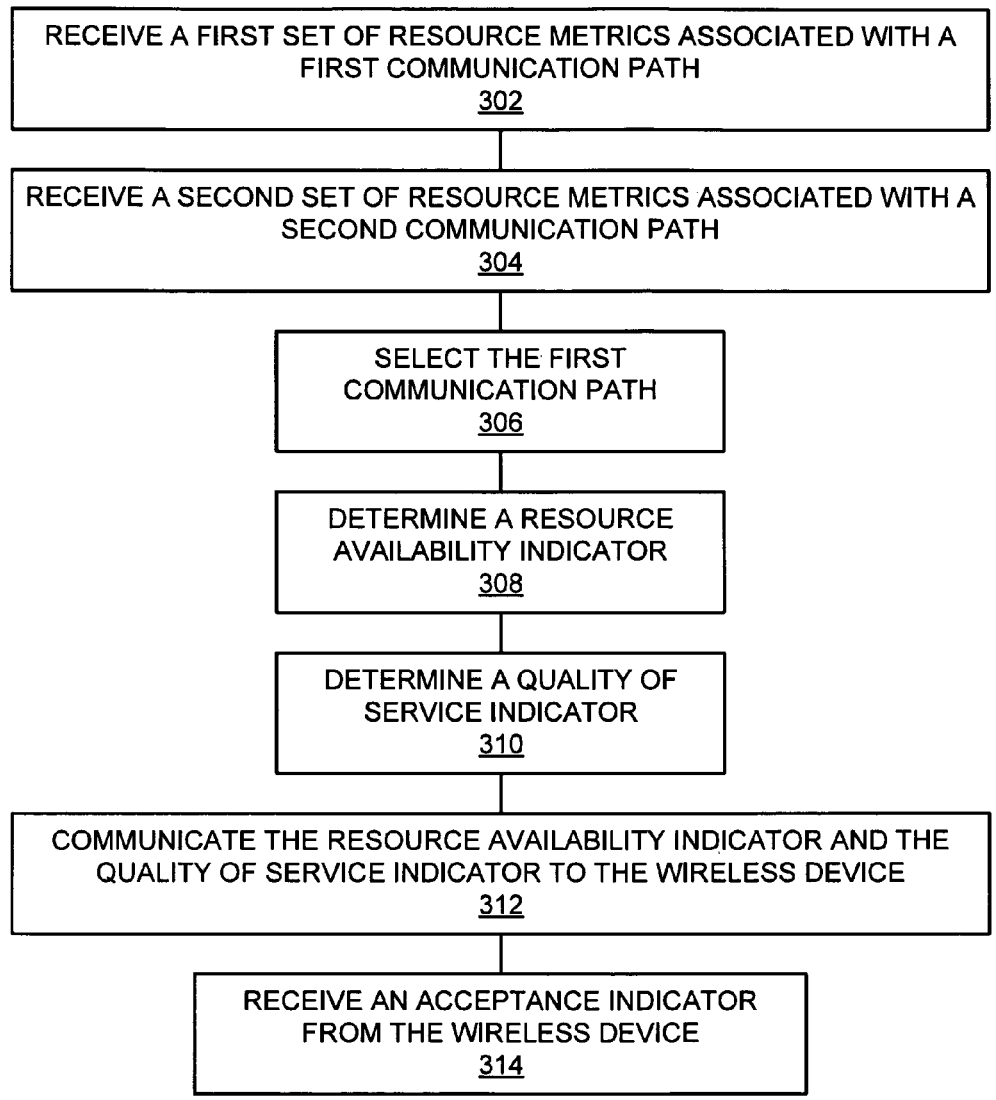
FIG. 3 is a flowchart illustrating a method of initiating a communication service.

FIG. 3 is a flowchart illustrating a method of initiating a communication service. The steps illustrated in FIG. 3 may be performed by one or more elements of communication system 100.

A first set of resource metrics that are associated with a first communication path are received (302). For example, gateway 130 may receive, from base station 120, one or more indicators associated with wireless link 115, base station 120, and/or backhaul link 125. The one or more indicators may be based on frame slot utilization, traffic throughput, quality of service required, maximum backhaul throughput, and/or maximum backhaul QoS.

A second set of resource metrics that are associated with a second communication path are received (304). For example, gateway 130 may receive, from base station 121, one or more indicators associated with wireless link 116, base station 121, and/or backhaul link 126. The one or more indicators may be based on frame slot utilization, traffic throughput, quality of service required, maximum backhaul throughput, and/or maximum backhaul QoS.

The first communication path is selected (306). For example, gateway 130 may select a path from wireless device 110 to service 150 via backhaul link 125, base station 120, and wireless link 115 based on the first set of resource metrics and the second set of resource metrics.

A resource availability indicator is determined (308). For example, gateway 130 may determine an indicator of the maximum throughput available to link wireless device 110 and service 150 along a communication path that includes wireless link 115, base station 120, backhaul link 125, gateway 130, and network 140.

A quality of service indicator is determined (310). For example, gateway 130 may determine an indicator of the best QoS available to link wireless device 110 and service 150 along a communication path that includes wireless link 115, base station 120, backhaul link 125, gateway 130, and network 140.

The resource availability indicator and the quality of service indicator are communicated to the wireless device (312). For example, gateway 130 may communicate a resource availability indicator (e.g., maximum throughput) and a quality of service indicator (e.g., WiMAX flow class) to wireless device 110.

An acceptance indicator is received from the wireless device (314). For example, wireless device 110 may send an indicator that initiates a service provided by service 150. In another example, wireless device 110 may send an indicator that terminates the process of initiating a service provided by service 150.

Figure 4:
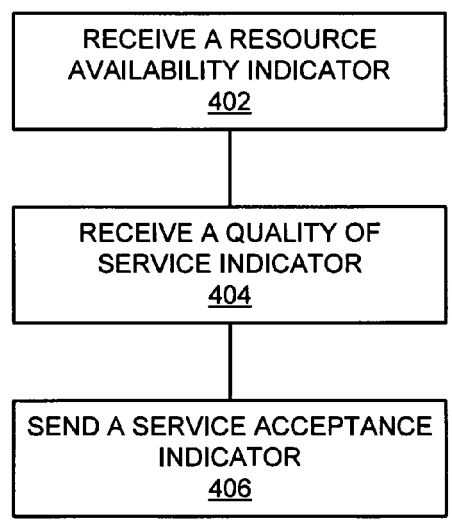
FIG. 4 is a flowchart illustrating a method of operating a wireless device.

FIG. 4 is a flowchart illustrating a method of operating a wireless device. The steps illustrated in FIG. 4 may be performed by wireless device 110.

A resource availability indicator is received (402). For example, wireless device 110 may receive an indicator of an available throughput along a communication path linking wireless device 110 and service 150.

A quality of service indicator is received (404). For example, wireless device 110 may receive an indicator of an available quality of service along a communication path linking wireless device 110 and service 150.

A service acceptance indicator is sent (406). For example, wireless device 110 may initiate a service provided by service 150. In another example, wireless device 110 may initiate a call or session by sending an acceptance indicator to gateway 130.

The methods, systems, networks, service, gateway, and base stations described above may be implemented with, contain, or be executed by one or more computer systems. The methods described above may also be stored on a computer readable medium. Many of the elements of communication network 100 may be, comprise, or include computers systems. This includes, but is not limited to: communication system 100, wireless device 110, base station 120, base station 121, backhaul link 125, backhaul link 126, gateway 130, access network 131, network 140 and service 150.

Figure 5:
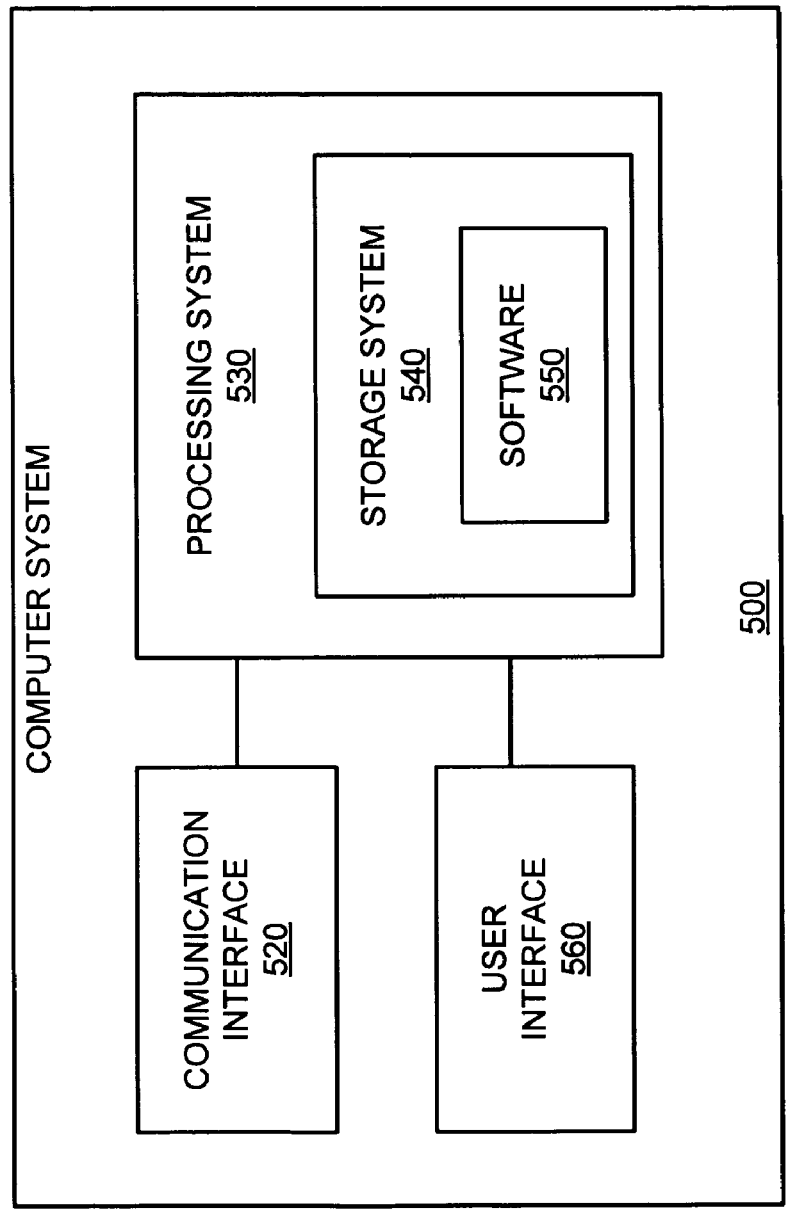
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:

receiving, by a network element of the communication system from a first base station of the communication system that is in communication with a wireless device requesting a service from a core network through the communication system, a first indicator that indicates the availability of a first air link resource, and wherein the first indicator comprises at least one of an available downlink throughput of the first air link and an available uplink throughput of the first air link;

receiving, by the network element from a second base station of the communication system that is in communication with the wireless device requesting the service, a second indicator that indicates the availability of a second air link resource, wherein the second indicator comprises at least one of an available downlink throughput of the second air link and an available uplink throughput of the second air link;

receiving, by the network element from the first base station, a third indicator that indicates the availability of an access network resource, wherein the third indicator comprises one of an available downlink throughput of a first backhaul link between the first base station and an access network and an available uplink throughput of the first backhaul link between the first base station and the access network;

receiving, by the network element from the second base station, a fourth indicator that indicates the availability of the access network resource, wherein the fourth indicator comprises one of an available downlink throughput of a second backhaul link between the second base station and the access network and an available uplink throughput of the second backhaul link between the second base station and the access network;

determining, by the network element, a core network resource indicator, wherein the core network resource indicator comprises an indication of network resources available provide the service to the wireless device by the core network;

selecting, by the network element, one of the first base station and the second base station based on the first indicator, the second indicator, the third indicator, and the fourth indicator for providing the service;

determining, by the network element, a path resource indicator based on the first indicator, the third indicator, and the core network resource indicator, when the first base station is selected;

determining, by the network element, a path resource indicator based on the second indicator, the fourth indicator, and the core network resource indicator, when the second base station is selected;

communicating, by the network element, the path resource indicator to the wireless device; and, receiving, by the network element, a response to the path resource indicator from the wireless device, wherein the response comprises an indication of whether the wireless device accepts service based on the path resource indicator.

2. The method of claim 1, wherein the response to the path resource indicator comprises an indicator of an acceptance, when the wireless device determines that a service level corresponding to the path resource indicator is sufficient to support a desired communication session.

3. The method of claim 1, wherein the response to the path resource indicator comprises an indicator of a rejection, when the wireless device determines that a service level corresponding to the path resource indicator is insufficient to support a desired communication session.

4. The method of claim 1, wherein the first indicator and the second indicator are based on at least one of frame slot utilization, traffic throughput, and quality of service required for a communication session between the wireless device and a second wireless device.

5. The method of claim 1, further comprising:
determining, by the network element, a service resource indicator based on at least one of an indicator of RF conditions associated with the wireless device, an indicator of service throughput, and an indicator of quality of service.

6. The method of claim 5, wherein the third indicator and the fourth indicators are based on at least one of an access network maximum capacity, an access network supported quality of service, access network traffic, access network utilization, and the service resource indicator.

7. The method of claim 1, wherein the core network resource indicator is based on at least one of a core network quality of service indicator and a core network throughput.

8. The method of claim 1, wherein the path resource indicator is further based on a fifth indicator that indicates the availability of an access network gateway resource.

9. The method of claim 1, wherein the network element comprises an access network gateway that operatively couples an access network to the core network.

10. A method of initiating a communication service, comprising:
receiving, by a network element of a communication system, a first set of resource metrics associated with a wireless device requesting a service from a core network through the communication system and a first communication path between the wireless device and an access network element, wherein the first communication path comprises a first wireless communication link between the wireless device and a first base station, and wherein the first set of resource metrics comprises at least one of an available downlink throughput of the first wireless communication link, an available uplink throughput of the first wireless communication link, an available downlink throughput of a first backhaul link between the first base station and the core network, and an available uplink throughput of the first backhaul link between the first base station and the core network;
receiving, by the network element, a second set of resource metrics associated with the wireless device requesting the service and a second communication path between the wireless device and the access network element, wherein the second communication path comprises a second wireless communication link between the wireless device and a second base station, and wherein the second set of resource metrics comprises at least one of an available downlink throughput of the second wireless communication link, an available uplink throughput of the second wireless communication link, an available downlink throughput of a second backhaul link between the second base station and the core network, and an available uplink throughput of the second backhaul link between the second base station and the core network;
selecting, by the network element, one of the first communication path and the second communication path based on the first set of resource metrics and the second set of resource metrics;
determining, by the network element, a resource availability indicator and a quality of service indicator based on the set of resource metrics corresponding to the selected communication path;
communicating, by the network element, the resource availability indicator and the quality of service indicator to the wireless device; and,
receiving, by the network element, an acceptance indicator from the wireless device.

11. The method of claim 10, further comprising:
initiating the communication service between the wireless device and a core network element in response to the acceptance indicator.

12. The method of claim 11, further comprising:
determining, by the network element, a third set of resource metrics associated with the core network element and a third communication path between the core network element and the access network element, wherein the third set of resource metrics comprises an indication of network resources available provide the service to the wireless device by the core network
wherein the resource availability indicator and the quality of service indicator are further based on the third set of resource metrics.

13. The method of claim 10, wherein the first set of resource metrics and the second set of resource metrics comprise an indicator that is based on at least one of frame slot utilization, traffic throughput, and quality of service required for a communication session between the wireless device and a second wireless device.

14. The method of claim 10, wherein the first set of resource metrics and the second set of resource metrics comprise an indicator that is based on at least one of RF conditions associated with the wireless device, an indicator of service throughput associated with the wireless device, and an indicator of quality of service associated with the wireless device.

15. The method of claim 10, wherein the first set of resource metrics and the second set of resource metrics comprise an indicator that is based on at least one of an access network maximum capacity, an access network supported quality of service, access network traffic, and access network utilization.

* * * * *